July 8, 1930.  M. M. TITTERINGTON  1,770,246
COMPASS DIRECTION CONTROLLER
Filed Nov. 19, 1926  3 Sheets-Sheet 3
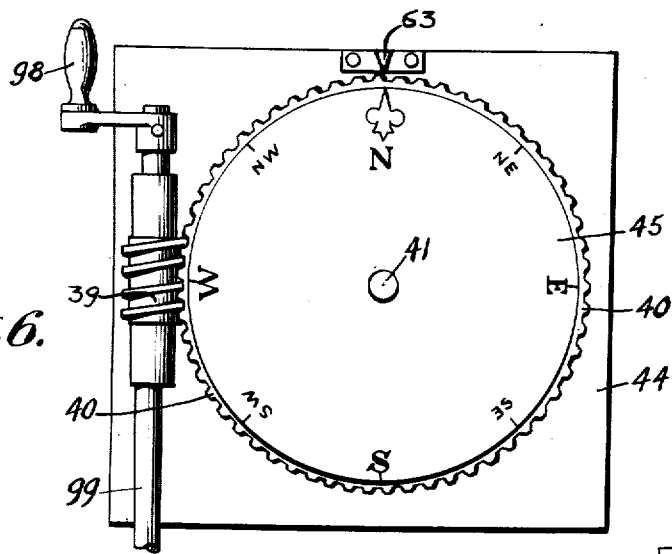
*Fig. 6.*
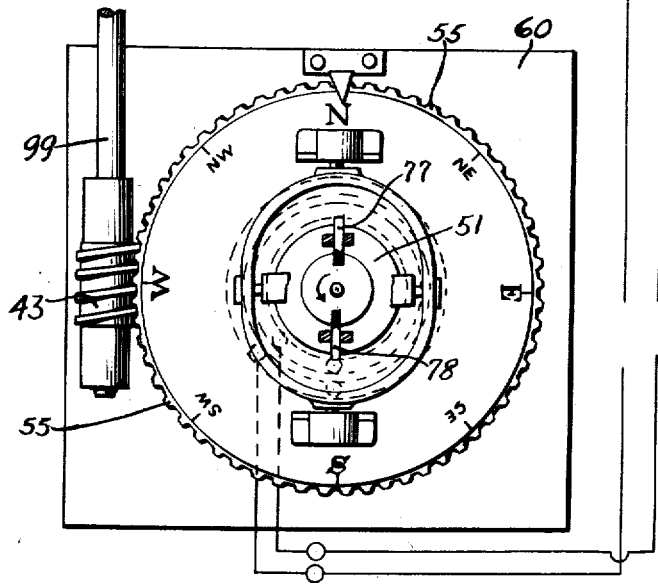
*Fig. 7.*
*Fig. 8.*
Inventor
MORRIS M. TITTERINGTON
By Attorneys
Bohleber & Ledbetter Patented July 8, 1930

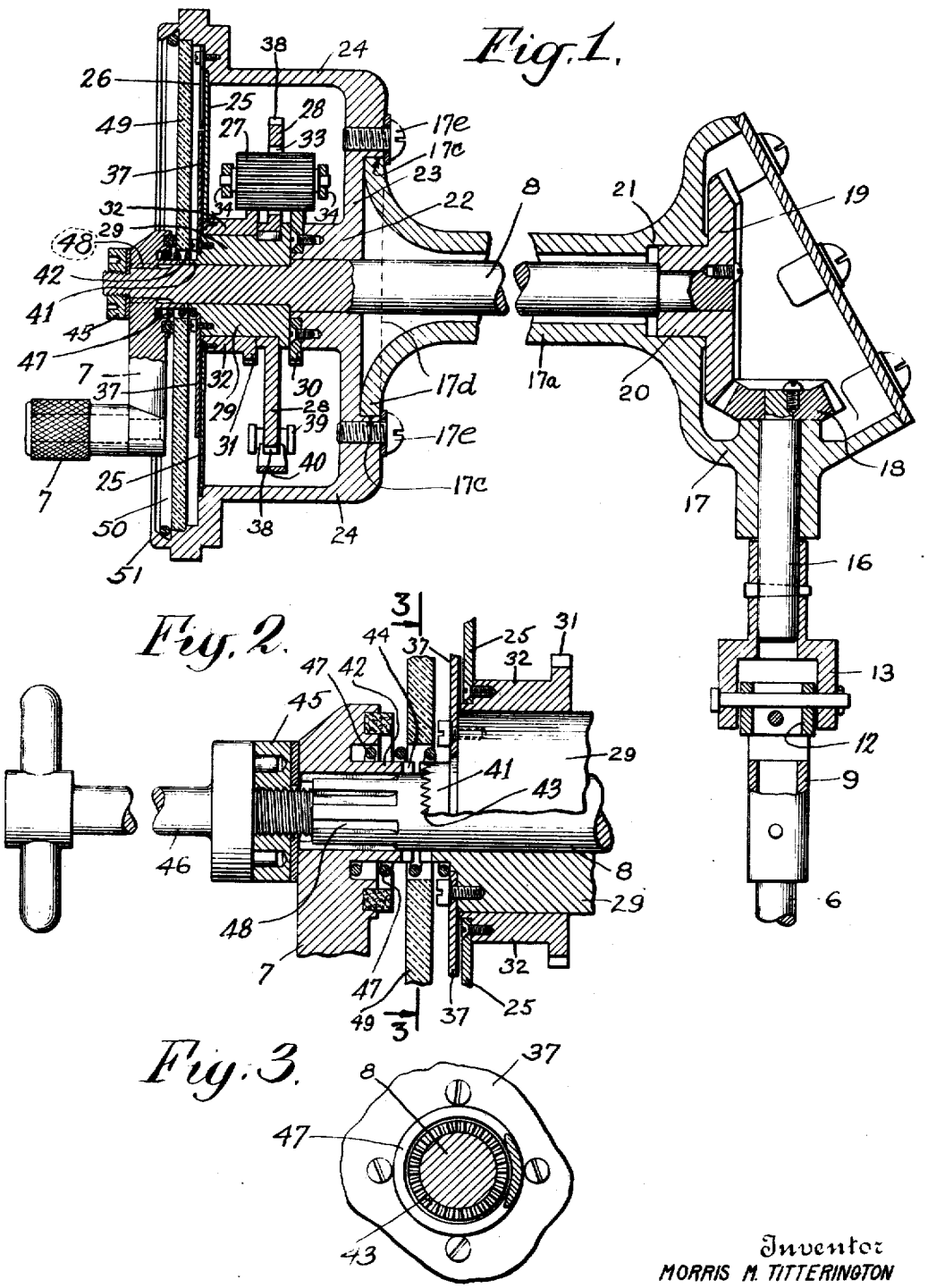

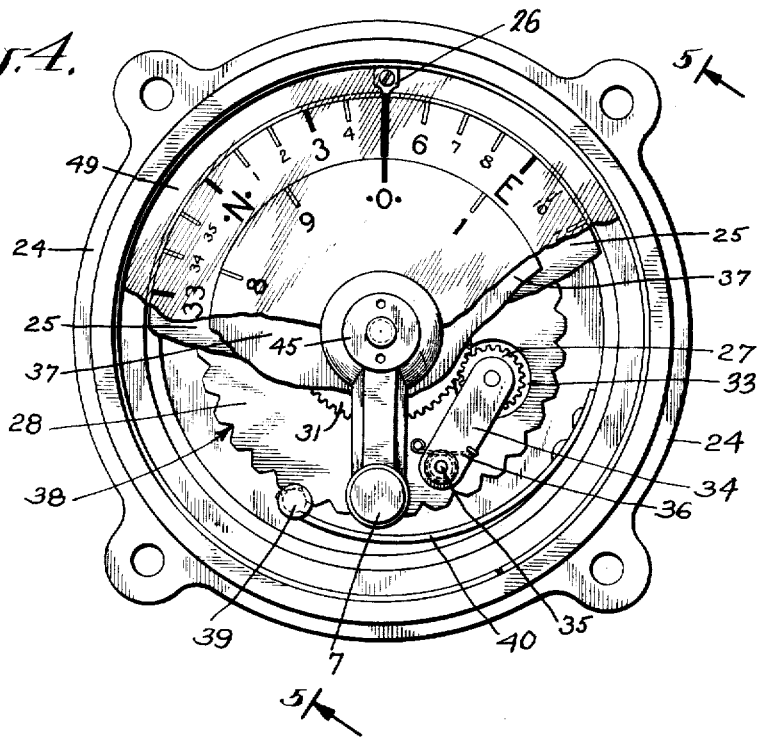
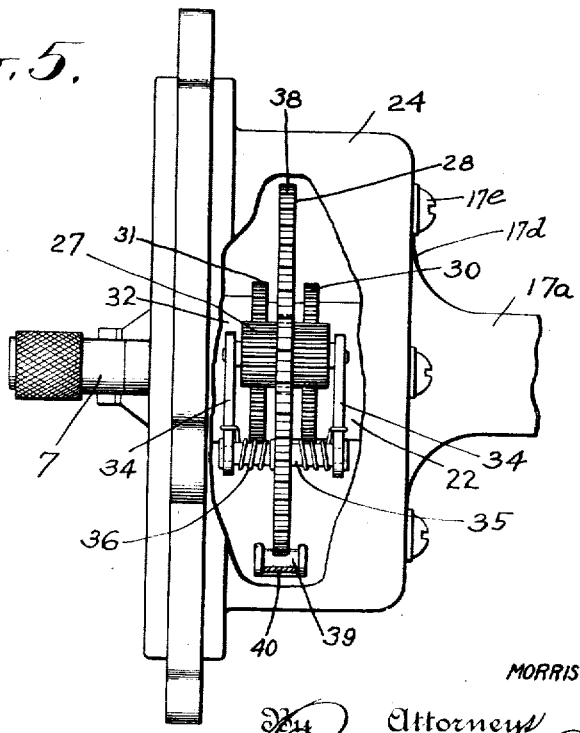

1,770,246

UNITED STATES PATENT OFFICE

MORRIS M. TITTERINGTON, OF BROOKLYN, NEW YORK; GEORGE A. TITTERINGTON, EXECUTOR OF SAID MORRIS M. TITTERINGTON, DECEASED, ASSIGNOR TO PIONEER INSTRUMENT COMPANY INCORPORATED, OF BROOKLYN, NEW YORK, A CORPORATION OF NEW YORK

COMPASS DIRECTION CONTROLLER

Application filed November 19, 1926. Serial No. 149,358.

This invention relates broadly to earth inductor compass systems and especially to controlling means therefor. More particularly the invention relates to a compass direction controller constituting a unit in a compass system.

This application is based upon and is an improvement of my former rotary coil compass (earth inductor compass system), application for patent filed March 11, 1922, Serial Number 542,937, wherein a complete earth inductor compass system, is disclosed and claimed, but I will describe herein the purposes and requirements of an inductor compass system to render comprehensible my present invention of a compass controller.

An earth inductor compass system may be employed for all purposes of navigation and involves the use of a generator armature rotating in the earth's magnetic field together with means for measuring the direction of the earth's flux lines. As in the ordinary electric generator the adjustable turning or orienting of the generator brushes about the commutator discloses, upon a galvonometer connected therewith, two positions of maximum potential and two positions of minimum or no potential.

When a generator is used as a part of an earth inductor compass system, as an aid to navigation, its artificial field is omitted and it rotates in the earth's field and it may be referred to as an inductor generator. The commutator brushes of the inductor generator may be set or adjustably turned or oriented through a complete circle about a normally vertical axis to cause a zero potential reading on an electric deviation indicator or steering meter when the inductor plane of the generator is maintained in a suitable given position, say perpendicular to a plane defined by the armature axis and the direction of the earth's flux. The compass controller forming the subject matter of this invention is in part employed as means to secure this given position or relation, i. e. it is actuated to adjustably orient the compass generator brushes about a normally vertical axis, while stabilizing means constitute the other or additional means to complete the maintenance of that position. In other words, the inductor plane of my compass generator is required to be established or maintained in a certain given position, i. e. in a predetermined relation to the earth's field so as to effect reliable null readings on an electric direction indicator, and this application relates to a compass controller therefor, while the stabilizing means therefor, the generator, and the other parts of the system are left for other applications.

By both stabilizing the generator's inductor plane and by adjustably turning or orienting it about a normally vertical axis, there is found a position where no electric potential is produced although the generator is operating at high speed in the earth's field, and hence a zero or null reading results on a deviation or steering indicator. By measuring and indicating the angle through which the adjustable orientation takes place, the indications preferably conforming to that of a compass, accurate directions and heading for accurate travel can be ascertained. All reckonings are made from a zero instrument reading on the steering meter and the correct heading being traveled is indicated only at that time when the instrument reads zero.

To remain on the desired course, it is only necessary to so steer the craft that the zero reading is maintained on an electric steering or deviation indicator forming part of a compass system. To change to another course it is only necessary to rotate the compass controller and set up a new direction on the controller compass dial indicating means and thereupon steer or turn the craft until a null indication again appears on the electric deviation indicator.

One object of the present invention is the provision of a compass controller, as it may be called, whereby the orientation of the generator brushes through a complete turn in an electric or inductor compass system (the compass system including generator not necessarily required to be shown in any detail for an understanding of this controller) can be effected manually, i. e. adjustably set through a complete turn to the required degree, which controller may be located for convenient operation by the pilot or navigator while the inductor generator itself may be remotely placed in a location unaffected by local magnetism. The compass controller and inductor generator are then operatively connected by a suitable telemetric interconnection by which the compass controller governs the action of the generator, particularly the brushes, to orient the generator and its inductor plane to maintain the above referred to given relation so that a zero reading obtains when the craft is headed in the direction indicated by the controller.

While to introduce my compass controller invention, I may refer to and briefly disclose as well, a simple form of inductor generator, its brushes, an electric steering or deviation indicator, and other elements of an earth inductor compass system, I will more particularly address this application to the compass controller as my present invention. With a preferred and novel type of inductor generator which is also my invention, there is provided rotary mounting means for the brushes together with transmission means such as gearing by which the orientation of the inductor plane of the generator is effected at the will of an operator through a complete turn. The rotary mounting means carries the brushes for adjustable orientation, while the transmission means co-operate therewith to impart turning movement to the mounting means and hence the brushes.

According to the present invention, a manually or even power operated controller means operates a driving member, such as a shaft, which is adapted to be connected to a flexible shafting or the aforesaid telemetric connection running to and connecting with the aforesaid transmission means on the compass generator so as to orient or set the generator brushes by the controller means to find a position of null reading on an electric steering or deviation indicator.

Another object of the invention is the provision of novel controller indicating means or controller compass dials which show, in terms of compass direction, the relative position or angular relation of the generator brushes with respect to the vehicle on which a compass system is mounted, and the pilot or navigator reads off the heading or direction being traveled from the controller indicating means. For this purpose the controller indicating means is graduated in degrees or other angular measures to correspond with the marks on an ordinary magnetic compass, and the controller correspondingly rotates the indicating means and the generator brushes. The controller indicator means may include cooperating compass-like dials, one of which rapidly turns at the same rate as the controller and the other is turned through a slow motion driving means at the same rate of turn as the generator brushes.

This invention also seeks to provide for the initial adjustment of the controller indicating means or compass dial or dials when first installed in service position on a craft to correspond with the zero potential position of the generator brushes of an electric compass system. To this end the controller compass dials are capable of being easily disconnected from the controller driving means or crank during the period of final installation and adjustment, so that the generator brushes may be adjustably oriented while the compass dial means is caused to remain stationary. In this way the proper working relation is established between the compass dials on the controller and the generator brushes. More particularly a clutch is availed of for this purpose, by which the compass dials of the controller is unclutched from that part of the apparatus running to a compass generator so that the aforesaid working relation may be easily brought about at the time the compass system is set up and installed. It follows that the present invention among other things greatly facilitates the installation of an electric compass system.

Also it is an object to provide a controller housing which to advantage is adjustable in that it may be made say in two or more parts anchored together but capable of being adjustably turned one in relation to the other. One of the adjustable housing parts carries transmission means such as gearing to drive a power take off shaft by which said take off shaft may be pointed in any desired direction in the craft without disturbing the set position of that part of the housing carrying the indicating means.

These and other objects of the invention and the means for their attainment will be more apparent from the following detailed description taken in connection with the accompanying drawings illustrating an example and a preferred embodiment of the invention, in which:

Figure 1 is a longitudinal section, showing a controller for an earth inductor compass system according to the present invention.

Figure 2 is a fragmentary view on an enlarged scale of clutch means between the controller driving means or shaft and the controller indicating means or compass dials by which the shaft may be rotated while the dials remain stationary to attain adjustment of the above mentioned working relation between the generator brushes and the controller, and the clutch is here shown disengaged, while it is engaged in Figure 1.

Figure 3 is a fragmentary view, in transverse section taken in the plane indicated by the line 3—3 in Figure 2, looking in the direction of the arrows, and showing one element of the clutch to disconnect the controller dials from the controller drive mechanism.

Figure 4 is an end view of the controller looking from the left in Figure 1, showing the indicating means or compass dials, and parts being broken away to show details of a slow motion or differential driving connection between the controller driving shaft and the dials.

Figure 5 is a view, showing the slow motion or planetary driving connection in side elevation, the controller case having been broken away generally in the plane indicated by the line 5—5 in Figure 4.

Figures 6, 7, and 8 show a simple type of compass controller and related parts divided from my former application Serial Number 542,937, and showing a simple form of inductor compass system by which to illustrate the principles of my invention which includes rotary mounting means associated with an inductor generator together with transmission means thereon carried to effect brush orientation, and includes controller means to both effect the orientation and to measure and indicate the angle thereof in terms of compass direction.

In earth inductor compasses (first referring briefly to Figures 6, 7, and 8) an electric generator armature 51 is driven by suitable means to cut the earth's magnetic lines of force to produce electric potential. As in any electric generator the external potential is dependent upon the relative position of the current collecting brushes with respect to the direction of the field flux. If, therefore, the brushes 77 and 78 of an earth inductor compass generator 60 are oriented about a normally vertical axis to a predetermined position in relation to the direction of the earth's flux lines, a zero potential reading is obtained on an electric direction steering indicator or galvanometer 47 when the vehicle, say an aircraft, on which an earth inductor compass is installed, is headed in that direction shown on a controller compass dial 45 at the lubber's line 63. The inductor generator 60 and compass direction controller 44 may be widely separated and are operatively connected by a suitable telemetric connection 99.

The generator armature 51 and brushes 77 and 78 are carried with or upon rotary mounting means, an example of which may be a gear 55 journaled upon the generator frame or base 60. A drive pinion as a worm 43 engages and turns the gear 55. The gears 43 and 55 constitute a transmission means forming part of a novel inductor generator as shown in my former patent application. This transmission means for simplicity may also include the rotary mounting means, to-wit the larger gear 55 which supports the armature, and particularly the brushes in order that they may be adjustably turned about a normally vertical axis.

In the same way that the shaft 99 connects the controller 44 with the transmission means 43—55 of the generator 60, my improved compass controller, Figures 1 to 5, is likewise connected to an inductor generator transmission through the same shaft 99 or a similar one. It is my improvement in respect to inductor generators, to-wit "transmission means" to govern the brushes with which my improved controller is related so that the transmission means can be operated at will by a pilot or navigator while in flight or travel. What is of further importance is that the transmission means of course maintains the brushes in their set position until again reset to establish another heading. For this purpose I find a transmission means 43—55 of the worm and worm-wheel type well fitted for the work at hand because they afford suitable speed reducing means and locking means against accidental turning when once a heading is established and the operator removes his hand from the crank 98.

The functioning of an earth inductor compass depends upon the use of the generator 60 wherein its armature 51 rotates in the earth's magnetic field. From the analogy of an ordinary electric generator, it will be appreciated that the orientation of the generator brushes 77 and 88 will disclose two positions of maximum potential and two positions of zero potential. When the earth inductor compass is installed, a determination is then made of a given direction corresponding to one of these zero positions. The controller 44 is so connected to the rotary brushes 77 and 78 of the generator 60 that this given direction is indicated on the controller compass dial 45 when the brushes are in the zero-potential position disclosed on the direction steering meter 47. The subsequent rotation of the controller dial 45 through any angle rotates the brushes 77 and 78 through the same angle, and in order to re-establish this same angular relation between the brushes and the earth's field, the aircraft must be turned or steered through the same angle, and hence is brought to the newly indicated heading which the pilot reads off the controller indicator dial or card 45 at the time the direction indicator 47 shows zero. The angle in question being known, by observing the controller compass card 45 and being transposed into terms of direction onto said compass card, it follows that the lubber's line 63 always shows the direction provided it is read at the same time the steering meter 47 is at zero.

The adjustment of the position of the current collecting brushes 77 and 78 of an inductor generator in relation to the earth's field is effected by my improved compass direction controller through a brush setting shaft or flexible shafting, a fragment of which is indicated at 6 in Figure 1, which is in fact the shaft 99 of Figures 6 and 7, and which shaft 6 or 99 is turned by a crank 7 carried on the outer end of the controller driving shaft 8, which in turn is connected with the flexible shafting 6 by gearing whereby a small angular rotation of the driving shaft 8 and crank 7 may effect an increased angular rotation of the flexible shafting 6 if my improved controller is used rather than the controller shown in Figure 6.

The shafting 6 forms a driving connection between the compass controller and the transmission means of a compass generator, and is installed in the fuselage of the craft, and it is a purpose of the controller to connect with and operate the shaft 6. This brush setting or power take off shaft 6 may terminate in a shaft coupling sleeve 9 for connection with any suitable form of joint, preferably a universal joint 12—13 by which the shaft 6 may be connected with the controller, and by which the shafting 6 is connected to and turned by a stub shaft 16 journaled in gear housing 17 and constituting a part of the controller. Thus the power take off shaft 6 is designed to connect with the smaller gear, the worm 43, of an inductor generator transmission means.

The stub shaft 16 carries at its end a bevel pinion 18 while a bevel gear 19 is carried on the rear end of the controller drive shaft 8 with the crank 7 on the front end thereof. This gear 19 may be formed with an enlarged hub 20 by which the shaft 8 and gear 19 are journaled in a bearing 21 formed in a transmission housing 17. At its opposite end the shaft 8 is journaled in a bearing 22 formed on the inner wall 23 of the controller case 24. The gear 19 is preferably made larger than the gear 18 so that errors, if any, in the controller indicators or in the compass generator as occasioned by the back-lash in the long jointed or flexible shafting 6 or 99, will be minimized. The gear 19, or any similar means, may also be made larger than gear 18 so that the shaft 6 or 99 and pinion 43 at the inductor generator (Figure 7) may be speeded up and hence the generator brushes be oriented at a suitable speed, although the brushes are preferably oriented at a slower rate than the turning motion of the crank 7.

It will be noted therefore that I have produced a housing for the compass controller comprising a gear housing 17 spaced from a controller case or housing 24 which are joined by a tubular housing sleeve or spacer member 17ª. The case 24 contains in the main the essential controller elements, while the gear housing 17 is spaced from the case 24 in order that the brush setting shaft 6 be taken off at an adjustable angle and away from the case 24. In this way the shaft 6 will clear all parts at the rear of an instrument panel on which the case 24 is mounted, and installation of the compass controller is rendered convenient.

The housing sleeve 17ª is preferably made separate from one or the other of the housing parts 17 or 24 so that the case 24 may be secured to an instrument board and the shaft 16 pointed in the direction of the generator. For this purpose, the case 24 may be socketed at 17ᶜ to receive a flange 17ᵈ on the end of the sleeve 17ª. Screws 17ᵉ or other locking means anchors the sleeve flange onto the rear of the case 24 against displacement. However the screws 17ᵉ may be loosened for the purpose of installation so as to lay out the shafting 6 in the right direction. Thus the sleeve housing 17ª may be rotated in relation to the case 24 and then permanently anchored against further movement.

Rotation of the drive shaft 8 not only rotates the flexible shafting 6, but the angle of orientation of the generator brushes is shown upon the face of controller indicating means, to-wit, a slowly rotating compass dial 25 which is rotated by the shaft 8 through a differential drive means with reference to a stationary index or lubber's line 26. That is, the number of turns through which the shaft 8 is rotated and hence the angle through which the brushes 77 and 78 of an earth inductor generator are turned, is indicated in terms of direction by the angular displacement of the compass dial 25 with respect to the index 26. The dial 25 is marked to correspond with a magnetic compass, the four cardinal points being represented by the letters N, E, S and W, while the intervening graduations are numbered from 1 to 35.

Several turns of the controller crank 7 are required to impart one turn to the generator brushes 77 and 78 by reason of a gear reduction transmission means on a generator not shown in connection with my improved controller but is shown at 43—55 in Figure 7, and with which the shaft 6 is intended to be connected. The small gear 43 engages the larger generator mounting and brush carrying gear 55 at the end of shaft 99 in Figures 6 and 7, and by reference thereto this gear reduction feature is understood. Since the angular movement of the compass dial 25 must equal that of the generator brushes with which the controller is adapted to be connected, there is provided a slow motion drive by which said dial 25 is turned slowly and uniformly with the slowly turning generator brushes but at a slower angular rate than the crank 7, drive shaft 8, and rapidly turning vernier dial 37 to be described. Therefore the compass dials 25 and 45 turn at the same rate as the generator brushes 77 and 78 but slower than cranks 7 and 98.

The differential slow motion driving means for turning the compass dial 25 at the same rate as the generator brushes comprises planetary gearing in which a planet pinion 27 is carried by a detent wheel 28 anchored on a detent hub 29 journaled on the shaft 8 and normally rotated thereby when the crank 7 is turned. The planet pinion 27 is in mesh with a stationary gear 30 secured to the bearing 22 or case. A freely rotatable gear 31 is journaled on the hub 29 and is made with a sleeve portion 32 which carries the compass tens slow motion dial 25. Thus the faster moving dial 37 is carried by the detent hub 29, and the dial 25 is carried by the gear hub 32, and these two dials turn relatively one to the other in the same direction. The outer compass dial 25 is marked to simulate a compass card of the ordinary kind and is sometimes called the tens dial while the inner or smaller dial 37 is preferably graduated with numerals and is sometimes called the units dial and is employed in the capacity of a vernier to obtain fine readings against the dial 25.

By suitably proportioning the gears 30 and 31, a predetermined relation between the rate of turn of the rotating dial 25 and shaft 8 may be obtained. While the planet pinion 27 may be mounted for concentric rotation about the shaft 8 in various ways, it is here disposed within an aperture 33 formed in the detent wheel 28 and journaled on one end of a pair of arms 34 disposed respectively upon either side of the wheel 28, and the other ends of the arms 34 are pivoted upon a planet bridge post 35 anchored in the detent wheel 28. Springs 36 have ends coiled about the post 25 and the other ends engage the respective arms 34 to cause the planet pinion 27 to mesh with the gears 30 and 31. Thus the gear 31 is driven at relatively slow speed as compared to the shaft 8 by reason of the gear 30 being stationary which imparts slow rotation to said gear 31 and dial 25 as the pinion 27 travels around the shaft 8 in engagement with the stationary gear 30.

The yielding spring-like engagement of the drive pinion 27 with the gears 30 and 31 affords a means of driving from one gear to another where one gear 30 may have a less number of teeth than the other gear 31. In fact if the two gears vary slightly as to number of teeth, then the planet pinion 27 may ride at a slight angle to the axis of the shaft 8, and the spring engaging means and mount for the pinion 27 holds it in mesh with the driven gear 31. This construction and arrangement is simple and comprises few parts and forms a suitable dial transmission means where the two gears vary one, two or a few teeth in number.

In order to obtain an indication of subdivisions smaller than those shown on the tens dial 25, the vernier or unit dial 37 is included in the controller, and is divided into ten equal parts and is numbered from 1 to 10 as shown in Figure 4. This dial 37 is rigidly mounted on the hub 29 and normally turns at the same speed as the shaft 8 and in relation to the tens dial 25. As contemplated, one complete revolution of the shaft 8, and hence of the dial 37, effects only a movement of tens dial 25 through an angle represented by one subdivision thereon and the slow motion gearing between the controller shaft 8 and compass dial 25 is so proportioned as to afford this relation. As a further means of definitely and equally subdividing the angle though which the shaft 8 may be turned, the detent wheel 28 is formed with, say, forty peripheral notches 38 so that turning of the wheel 28 through an angle including four notches corresponds to a rotation through one subdivision on the vernier dial 37, i. e. from one numeral to the next.

As retarding or braking means for the wheel 28 to hold the compass dials and the controller crank 7 and gear mechanism in fixed position after the operator releases the handle 7, and also to definitely determine rotation over an angle corresponding to one-fourth of one of the units on the vernier dial 37, a detent roller 39 is caused to yieldingly spring into and engage the periphery of the detent wheel 28 and enter the notches 38. One end of a leaf spring 40 is secured to the controller case 24 and the other end thereof carries the roller 39 which is continuously urged against the detent wheel notches 38 to hold all parts stationary when not in operation.

In order to provide for the initial adjustment of the compass dial 25 with respect to the lubber's line 26 and also to correspond to the zero potential position of the brushes of a compass generator, provision is made for temporarily disconnecting both dials 25 and 37 from the shaft 8. The dials are then held stationary by the detent roller 39 engaging the detent wheel 28 and prevents the slow motion mechanism or differential gears 30, 31, and 27 from functioning. Thus the shaft 8 may be rotated until the generator brushes are oriented into an adjusted position to correspond with the dial indication and the heading of the aircraft, whereupon the dials are again connected to the controller drive means. This disconnection of the controller indicating means from the driving means is effected through the instrumentality of clutch means between the shaft 8 and the slow motion driving means and will now be described.

As noted in Figures 1 and 2 the left hand end 41 of the detent hub 29 and the right hand end of a sleeve portion 42 formed on the crank 7 are provided with co-operating crown gear clutch teeth 43 and 44, and these clutch teeth are normally retained in clutching engagement by a nut 45 screwed on the threaded end of the shaft 8. When it is desired to disconnect the slow motion gearing 30 and 31 from the shaft 8, the nut 45 is loosened, say by a wrench 46, thereby permitting the teeth 44 to be forced out of engagement from the teeth 43 by a coil spring 47 which is disposed under compression between the two clutches 41 and 42. The end of the crank 7 and the shaft 8 may be broached as shown at 48 to permit free relative axial sliding movement between the crank 7 and shaft 8 while insuring rotation together. Obviously, any other type of connection between the crank 7 and shaft 8 may be used so long as relative movement axially is possible without affecting the driving connection therebetween. When the clutch 41—42 is disconnected, both dials 25 and 37 remain stationary while the crank 7 turns, and thus the brush setting shaft 6 and hence the generator brushes may be adjusted in relation to the dials because the disconnection of the dials clutch 41—42 does not interrupt the drive from the crank 7 to the shaft 6 and hence to the generator.

The front face of the controller case 24 is closed by a glass window 49 held in position by a spring 50 disposed in the bezel rim 51, and thus the instrument is protected and the compass dials are clearly exposed to observation. The case 24 is adapted to be secured in an instrument panel and the rear end transmission parts of the controller are then spaced back out of the way to the rear of a panel.

In the operation and use of the instrument, and when the compass system is initially installed for instance in an aircraft, the craft is first headed in a known direction or toward one of the cardinal points of a compass, say north, and the compass dial 25 is turned until the graduation N coincides with the lubber's line 26. With the aid of the wrench 46 the nut 45 is loosened, permitting the spring 47 to expand and separate the clutch elements 43 and 44, thus releasing the slow motion driving connection from the shaft 8 and hence the dials 25 and 37 from rotation with the shaft 8. The dials remain stationary and the handle 7 is turned, thereby turning the brush orienting means until a direction indicating steering galvanometer, as for example 47, which is a part of an electric compass system, shows that a zero potential position for the brushes has been found. The clutch 41—42 is now permanently engaged by use of the wrench 46 on the nut 45 whereby both dials 25 and 37 are again fixed to the shaft 8 and the controller is now ready for service in navigating the aircraft. The compass dials 25 and 37, the position of the generator brushes 77 and 78, and the steering meter 47 are now all coordinated so that said meter reads zero when the aircraft is headed in the direction indicated by the compass dials.

In flight it is then only necessary, in order to follow the desired course, to set the dial means 25 and 37 by the crank 7 to indicate the desired compass reading or heading and the aircraft is steered or turned in its flight until a zero potential reading is obtained on the steering or deviation galvanometer 47 at which time the craft is on that heading shown on the compass controller dials 25 and 37.

It will thus be seen that a compass controller has been provided as a unit or separate element for use in connection with earth inductor compass systems whereby the orientation of the generator current collecting brushes is effected through a complete turn from a remote location. Suitable indications in terms of direction of the relative position of the brushes with respect to the points of the ordinary magnetic compass are given and the indicating means affords a convenient guide whereby the brushes may be turned to secure the desired relation with the earth's magnetic field which extends in a general north and south direction so that an inductor generator sensitively picks out the direction of the earth's flux lines and reflects their direction on the controller dials.

Furthermore I have produced novel controller indicating means wherein the tens dial 25 reads similar to an ordinary compass card and a units or vernier dial 37 cooperates with the tens dial 25 for fine or fractional degree compass reading, and with this combination I attain a very fine generator brush setting so that headings in single degrees or even fractional parts of a degree may be attained, i. e. the brushes of an inductor generator are capable of being set in closely defined fractional degrees. Thus my combination compass dial means enables a navigator to more precisely lay out and follow a given course than is possible with the one compass dial 25 only.

Note for example the dial setting of Figure 4 where the mark 5 on the compass dial 25 is under the lubber's line 26 and the 0 mark on the vernier dial 37 is at the lubber's line. This setting reads 50 degrees east from north. A preferred construction and gear ratio for the two dials is as shown, namely one turn of the vernier dial 37 advances the compass dial 25 ten degrees and hence uniformly advances the generator brushes a like ten degrees. The general direction is set into and read from the compass dial 25 while this general direction is drawn or narrowed down to a fine limit or compass setting and read in degrees or fractional degrees from the vernier dial 37.

Various modifications may be made in the character of the change speed gearing 18 and 19 interposed between the driving crank means 7 and the flexible or universal jointed shafting 6 running to the brush orienting or adjustable turning means on an inductor generator, and also in the type of slow motion gearing 30, 31 and 27 which drives the controller indicators. Furthermore various types of controller indicating means or compass dials may be incorporated in the combination. Various modifications may occur to those skilled in the art, but no limitation is intended by the description or illustrations other than as defined in the appended claims.

While this controller is manually operated, it is to be understood that it is thus disclosed for simplicity. Motor means, as an electric motor, may be utilized to periodically turn the controller and generator brushes if desired. The particular drive means shown, to-wit the crank 7 provides a compact small size assembly since it may turn within the area of the case 24 or compass dial or dials, and the crank is mounted centrally of the compass dials for that purpose.

My invention is presented to fill the need felt for a reliable controller unit to complete an earth inductor compass system and facilitate the installation thereof on the vehicle, and the foregoing is a complete description of an example of one preferred form of the compass controller.

Although I did refer to the simple form of controller in Figure 6 in briefly describing the inductor compass system shown in Figures 6, 7 and 8, I will again describe certain features having direct relation to the simple controller itself and apart from the system or combination, this because I lay claims to my former compass controller shown in Figure 6, in addition to the improved vernier and clutch compass direction controller in the other views.

A frame or base 44 rotatably supports a compass or direction indicating or controller dial 45 which turns about a shaft 41 carried with the base 44. The compass dial 45 cooperates with and is turned by a gear 40, and a lubber's line 63 points out the direction indicated on the compass dial. In the example of compass controller shown, the compass dial 45 is mounted upon and turns with the gear 40 but many modifications of construction may be made under the principle of the invention. The compass controller dial 45 is marked similar to an ordinary compass card and is read in the same way.

The compass controller 44 is connected by gear and shaft means or the like to the inductor generator 60, and the compass dial 45 and brushes 77 and 78 are designed to uniformly turn at the same angular rate so that the navigator at the compass controller 44 may set the inductor generator brushes in the desired position by observing the compass dial indication at the index 63.

For example, the navigator or the pilot knows, by setting a given direction, say north, into the compass dial 45, that the current collecting brushes will be similarly oriented to a zero potential position, i. e., to a position where no potential is produced (hence a null reading on the galvanometer 47) when the craft shall have been steered to a north heading, whereupon the pilot may depend upon a correct north heading by steering the craft until a null indication is attained on the direction steering or deviation indicator 47 and by maintaining the craft on that heading.

Any suitable form of controller drive may be provided, i. e. manual or power, by which the compass dial 45 and generator brushes 77 and 78 are simultaneously oriented. A crank and shaft means 99 including crank 98 is provided both as a drive through a worm 39 to the dial gear 40 and as a means to connect with transmission means on a generator. The gear ratios of the compass controller gearing 39—40 and of the generator gearing 43—55 are the same so as to attain the same uniform rate of turn for both the compass controller dial and generator brushes.

Preferably the worm gears 39 and 43 are smaller than the larger gear means with which they engage and thus several turns of the crank 98 and shaft means 99 is required to effect a 360 degree oriented adjustment of the compass dial and the generator brushes. In this way a finer and closer range or fractional degree setting of the compass dial 45 and generator brushes 77 and 78 may be attained if a relatively low gear reduction be employed to turn the controller and brushes and this same principle has been carried forward in my improved instrument shown in Figures 1 through 5.

The gear reduction 39—40 and 43—55 also eliminates or greatly reduces errors in the compass dial setting which would be otherwise introduced by reason of back lash in the shafting 99 and its various connections. It should be remembered that the shafts 99 and 6 are, for all practical purposes of understanding, one and the same shafts, i. e. the shaft coupling 9 is designed to be fastened to a long shafting 6 or 99 by which the generator 60 or any other may be governed by the improved controller of Figure 1. There may be universal couplings and other features or parts associated with the shaft 6 or 99 which cause play or back-lash in the telemetric connection 6 or 99 between the controller and generator. By employing the reduction gearing 43—55 and 34—40, and which are of equal value, there is accomplished two main purposes; namely, the back-lash is eliminated and no or little play exists between the generator brushes and controller and hence errors in brush and dial settings are nil, and fine or fractional degree compass and brush setting is attained so that an exact course may be laid out and followed.

By employing the worm and worm wheel type of gearing, particularly this type of transmission means at the generator 60, there is provided a stationary rotary mounting means in the gear 55 with which is carried the generator and commutator brush parts required to be oriented, since the worm 43 restrains the generator mounting means against rotation until motion is imparted thereto from the controller.

Thus the shafting 99 enables the compass controller and inductor generator to be remotely installed on the craft. It is obvious that the compass system is simple to install, that the generator may be placed in any convenient and efficient location, that it is reliable and rugged in construction, that a fine compass setting is possible and that the steering galvanometer is sensitive to the slightest deviation from the heading on the compass dial.

It is now seen that I have produced an earth inductor compass controller comprising operating means, the latter including a crank 7 or 98 or other like power producing means which connects the controller to the generator. The shaft 6 or 99 is adapted to be connected with rotary mounting means, such as the generator gear 55 or similar means, which carries the commutator brushes of a fieldless inductor generator used in electric compass systems. The rotary mounting means is susceptible of full or complete orienting movement by which the generator brushes are adjustably oriented and set to a null position on the commutator. The novel feature of outstanding importance is the direction indicator dial 45 or 25—37 connected with said operating means and with the rotary mounting means of a compass generator by which the indicator dial turns with the commutator brushes. The brushes and dial turn together at the same uniform rate, and the value of the angle, through which the brushes are oriented or displaced and set to hunt a null potential position on a deviation meter 47, is measured by and shown on the dial in terms of compass direction, since for the dial I usually employ a compass card 45 or compass vernier means 25—37.

I claim that it is broadly novel to hook-up compass dial means with the rotatably mounted commutator brushes of a fieldless generator to produce a compass for use in navigation because the combination is itself new and produces new results and a new mode of operation not heretofore attained in the art; and also this compass controller, as an element in the combination, is likewise new.

Two forms of compass direction controllers for electric compass systems have been described but it is to be understood that other forms may be produced in accordance with the principles of my invention.

What I claim is:

1. A controller means for an earth inductor compass system, including in combination with generator current-collecting means which are mounted for orientation; a drive shaft for orienting the said current-collecting means, and means to rotate the drive shaft, an index, a rotatable dial cooperating with the index, a rotatable vernier dial cooperating with the first named dial and index, slow motion driving connections between the shaft and the first named dial, and means to rotate the vernier dial from the shaft.

2. A controller for an earth inductor compass system, including in combination with generator brushes which are mounted for orientation; a drive shaft for orienting the brushes, means to rotate the drive shaft, a relatively stationary index, a rotatable dial and a vernier dial cooperating with the index, means fixing the vernier dial on the drive shaft to turn therewith, and a planetary connection between the shaft and the first named dial.

3. A controller for an earth inductor compass system, comprising in combination, a drive shaft and means to rotate it, a relatively stationary index, a dial turned from the shaft, and a slow motion driving connection between the drive shaft and dial including a planetary pinion turning with the drive shaft, a relatively stationary gear engaging the pinion, and a gear secured to the dial with which the pinion meshes.

4. A controller for an earth inductor compass system comprising, the combination with a housing, of a drive shaft, means to rotate the shaft, a relatively stationary index, a rotatable dial, a vernier dial carried with the shaft, a planetary pinion adapted to turn with the shaft, a gear fixed to the housing with which the pinion meshes, and a gear carried with the first named dial with which the pinion meshes.

5. A controller for an earth inductor compass system, comprising in combination with generator brushes and means mounting them for orientation; a drive shaft adapted to be connected with the brush mounting means, means to rotate the drive shaft, indicating means to show the relative position of the drive shaft, a driving connection between the shaft and said indicating means, and means to render the driving connection inoperative to permit relative adjusting motion between the shaft and indicating means.

6. A controller means for an earth inductor compass system, comprising a drive shaft, means to rotate the shaft, indicating means to show the relative position of the shaft, a driving connection between the shaft and said indicating means, disengaging means normally tending to render the connection inoperative, and engaging means to maintain the driving connection operative.

7. A controller for an earth inductor compass system, comprising a drive shaft, manual means to rotate the shaft, a compass dial to indicate the angular position of the shaft, a driving connection between the shaft and compass dial, and clutch means between the shaft and the driving connection to permit of relative angular adjustment between the compass dial and shaft.

8. A controller for an earth inductor compass system, comprising a driving shaft, means to rotate the shaft, a hub journaled on the shaft, a dial rotatably mounted on the hub, a gear secured to the dial, a relatively stationary gear, a planetary pinion carried by the hub and meshing with the said gears, and clutch means between the hub and shaft.

9. A controller for an earth inductor compass system, comprising a driving shaft, a crank carried on one end thereof, a hub rotatably mounted on the shaft, gear journaled on the hub, a dial carried by the gear, a vernier dial carried by the hub, a relatively stationary gear, a planetary pinion carried by the hub and meshing with both gears, and clutch means between the crank and the hub.

10. A controller for an earth inductor compass system, comprising a housing, a driving shaft journaled in the housing, a crank carried on one end of the shaft outside the housing, a hub rotatable on the shaft, a dial carried by the hub, a gear journaled on the hub to rotate therewith, a dial carried by the gear, a stationary gear carried by the housing, a detent wheel carried on the hub, a detent yieldingly engaging the wheel, a pinion carried with said wheel means to cause yielding engagement of the pinion with the gears, and releasable means to clutch the hub and shaft together.

11. A controller for an earth inductor compass system, comprising a housing, a driving shaft, a crank carried outside the housing and including a slidable connection with an end of the shaft, a detent hub rotatable on the shaft, said crank and hub being formed with co-operating clutch surfaces, a coil spring tending to separate the clutch surfaces, a nut on the end of the shaft to oppose the action of the spring, a gear journaled on the hub, a dial carried by the gear, a stationary gear carried by the housing, a detent wheel carried by the hub, a planetary pinion mounted on the detent wheel, means to yieldingly press the pinion in engagement with the gears, a vernier dial co-operating with the first named dial and carried by the hub, and a spring pressed detent carried in the housing and engaging the detent wheel.

12. A compass controller comprising, a pair of spaced housings one of which is adapted to be secured to an instrument panel, a tubular member joining the spaced housings by which the other housing is held in spaced relation from an instrument panel, a controller driving shaft mounted to turn in the tubular member with its ends reaching into the spaced housings, a driven shaft mounted in that housing which is adapted to be spaced from an instrument panel and at an angle to the controller shaft, gear means connecting the two shafts, and indicating means mounted in the housing which is adapted to be mounted on an instrument panel and operated by the controller shaft.

13. A compass controller comprising, a pair of spaced housings one of which is adapted to be secured to an instrument panel, a tubular member joining the spaced housings by which the other housing is held in spaced relation from an instrument panel, a controller driving shaft mounted to turn in the tubular member with its ends reaching into the spaced housings, a driven shaft mounted in that housing which is adapted to be spaced from an instrument panel and at an angle to the controller shaft, gear means connecting the two shafts, indicating means operated by the controller shaft, said controller shaft having an outer end thereof disposed through the indicating means, and a manually operated member carried on the outer end of the controller shaft in front of the indicating means.

14. A compass controller comprising, a pair of housings one of which includes means to anchor it to an instrument panel, a tubular member joining the spaced housings thereby mounting the other housing in spaced relation from a panel, a controller driving shaft mounted to turn in the tubular member with its ends reaching into the spaced housings, a driven shaft mounted in one housing at an angle to the controller shaft and gear means connecting the two shafts, indicating means mounted in the other housing and operated by the controller shaft and including a compass dial, differential gearing driving the compass dial from the driving shaft, a vernier dial carried with the driving shaft and co-operating with the compass dial, and means to rotate the controller driving shaft.

15. A compass controller comprising, a pair of spaced housings, a tubular member joining the spaced housings, a controller shaft mounted to turn in the tubular member with its ends reaching into the spaced housings, a driven shaft mounted in one housing at an angle to the controller shaft and gear means connecting the two shafts, indicating means mounted in the other housing and operated by the controller shaft, means normally engaged to connect and positively drive the indicating means with the controller shaft, and means to disconnect the indicating means to permit relative adjustment between the controller shaft and indicating means.

16. A compass controller comprising, a pair of spaced housings, a tubular member joining the spaced housings, a controller shaft mounted to turn in the tubular member with its ends reaching into the spaced housings and one end of said controller shaft reaching through a housing, a driven shaft mounted in one housing at an angle to the controller shaft and gear means connecting the two shafts, indicating means mounted in the other housing and operated by the controller shaft, operating means carried by the controller shaft end which reaches through the housing, means slidably connecting the operating means to the controller shaft, and clutch means interposed between the operating means and the indicating means.

17. A compass controller comprising, a pair of spaced housings and means for mounting them in spaced relation and in service position, a controller shaft mounted to turn in the spaced housings, controller direction indicating means carried in one housing and operated by the controller shaft, a driven means in the other housing operating at an angle from the controller shaft, drive means to turn the controller shaft and to turn the indicating means, and a clutch to disconnect the indicating means from the controller shaft.

18. A compass controller comprising, a pair of spaced housings, a tubular member joining the spaced housings, a controller shaft mounted to turn in the tubular member with its ends reaching into the spaced housings, a driven shaft mounted in one housing at an angle to the controller shaft and gear means connecting the two shafts, direction dial means mounted in the other housing and operated by the controller shaft, an outer shaft end included on the controller shaft which projects through the dial means and through the housing, a crank carried on the outer shaft end including means to permit a sliding though fixed driving connection with the shaft, a clutch and means by which rotation of the crank is transmitted to the dial means and by which a sliding movement of the crank on the shaft continues and discontinues operation of the dial means, and means to anchor the crank in fixed service position.

19. A controller for inductor compasses comprising in combination with generator brushes and rotary mounting means carrying them for orientation, a case, compass dial means mounted therein, a shaft journaled in the case with both shaft ends protruding through the case, operating means on one protruding shaft end by which the shaft is turned, suitable means on the other shaft end to connect with the rotary mounting means, and a drive connection in the case between the shaft and dial means for turning the latter.

20. A controller for inductor compasses comprising, a case, compass dial means mounted therein, a shaft journaled in the case with both shaft ends protruding through the case, operating means on one protruding shaft end by which the shaft is turned, suitable means on the other shaft end to connect with apparatus to be driven, a drive connection in the case between the shaft and dial means for turning the latter, and means to disconnect the dial means and render same stationary while the operating means and shaft is turned.

21. A controller for inductor compasses comprising, a case, compass dial means mounted therein including two concentrically mounted dials adapted to rotate one in relation to the other, a shaft journaled in the case with both shaft ends accessible through the case, operating means on one shaft end by which the shaft is turned, suitable means on the other shaft end to connect with apparatus to be driven, a slow motion drive connection in the case by which one dial is turned at a slower speed than the shaft, and a direct drive connection by which the other dial is turned at the same speed with the shaft.

22. A controller for inductor compasses comprising, a case, compass dial means mounted therein including a units dial and tens dial, a shaft journaled in the case with both shaft ends accessible through the case, operating means connected to one shaft end by which the shaft is turned, suitable means connected to the other shaft and to join with apparatus to be driven, a slow motion drive connection between the shaft and units dial, and means directly connecting the tens dial with the shaft.

23. A controller for inductor compasses comprising, a case, dial means mounted therein including a compass card and cooperating vernier dial by which the direction is roughly read from the compass card and finely read from the vernier dial, a controller shaft journaled in the case, drive means operated by the shaft to turn the dial means, a manually operated device carried on the shaft to turn said shaft, suitable means included by which the shaft is connected with apparatus to be driven, a clutch included in the drive means between the manually operated device to disconnect the latter from the dial means while the shaft is turned to facilitate installation and final relative adjustment between the dial means and shaft.

24. A controller for inductor compasses comprising, a controller shaft; two gears mounted concentric with the shaft, one of which rotates, and the other is stationary; a detent wheel mounted between the gears on the shaft, and having an opening therein spaced from its center; a pinion, means to mount the pinion in the detent opening and engaging both gears and rotating in the detent opening as the detent wheel and pinion turns about the shaft; dial means including a compass card rotated by one of the gears, and a vernier dial operated by the shaft and cooperating with the compass card to give close directive readings; and means to turn the controller shaft.

25. A compass controller comprising in combination with inductor generator brushes; indicating means, including a compass dial into which is set a general direction, and a vernier dial by which said general direction is drawn down to a fine fractional degree compass reading of narrow limits; means connecting the two dials together in working relation; said last named means comprising a controller shaft, and means to turn the latter, the vernier dial being turned with and at the same rate as the controller shaft, and a slow motion drive from the shaft to the compass dial by which the latter turns at a slower rate than the vernier dial and shaft; and transmission means operated by the drive shaft, including means by which the controller is attached through a telemetric connection to the inductor generator brushes aforesaid.

26. A compass controller comprising; a housing including, two spaced hollow members, and a rigid tubular connection carried between said members; controller mechanism carried within the housing, including direction indicating means, and drive means; and means whereby one spaced hollow member may be adjustably turned in relation to the other.

27. A compass controller comprising, a case adapted to be mounted on an instrument panel, compass-direction indicating and drive means carried by the case, a gear housing spaced from the case, gearing and a brush setting shaft carried within the housing and connected with the drive means, rigid tubular means joining the case and gear housing in fixed relation, and means whereby the gear housing may be adjusted in relation to the case to direct the brush setting shaft in the desired direction.

28. A compass controller comprising, a case adapted to be mounted on an instrument panel, direction indicating and drive means carried by the case, a gear housing spaced from the case, gearing and a brush setting shaft carried within the housing and connected with the drive means, and a rigid sleeve housing member interposed between the case and gear housing including means whereby the gear housing may be adjusted in relation to the case to direct the brush setting shaft in the desired direction.

29. A compass controller comprising; a housing, including two spaced housing parts, one of which is provided with a socket in its wall, a rigid spacer member interposed between the two housing parts, one end of the spacer member seated in the socket, means to adjustably anchor the end in the socket, and the other end being attached to the other housing part; operating means carried with the housing including a crank, a shaft driven by the crank, and a compass dial connected with and rotated by the shaft.

30. A compass controller comprising; a housing, including two spaced housing parts, one of which is provided with a socket in its wall, a rigid spacer member interposed between the two housing parts, a flange formed on the spacer member and disposed in the socket, and means anchoring the flange in the socket; and controller operating means carried with the housing including a compass dial rotated by the operating means.

31. A compass controller comprising, a case, controller operating and compass-direction indicating means carried within the case, a gear housing and means for attaching it to the rear of the case, driven means including a power take off shaft carried with the case, a shaft forming part of the operating means reaching from the case to the gear housing and connected with the power take off shaft, and adjustment means provided whereby a change of direction of the power take off shaft is effected.

32. A compass controller as specified in claim 31 wherein the adjustment means comprises, a shaft housing which covers the shaft and attached at each end to the case and gear housing, and means cooperating with the shaft housing for changing the general direction of the power take off shaft.

33. A controller comprising, a case, compass-direction indicating means in the case, a shaft in the case, means connecting the shaft and compass-direction indicating means in driving relation, a gear housing, means in the gear housing driven from the shaft including a power take off device, means whereby the general direction of the power take off device is adjusted, and means to disconnect the shaft from the indicating means.

34. A controller comprising, inductor generator brush turning means, a dial connected therewith and turning at equal rate thereto, a slow motion dial cooperating with the first dial; a speed reduction drive connecting the turning means with the second dial, including a stationary gear, a rotating gear attached to the slow motion dial and spaced in parallel relation from the stationary gear, and a pinion meshing with both gears and reaching from one to the other; and a device mounting the pinion to bridge from one gear to the other, including means at each end of the pinion whereby the pinion axis adjusts itself to the gear axis and to hold the respective ends of the pinion in mesh with the gears.

35. A controller for an earth inductor compass system comprising the combination with inductor generator current-collecting means and rotary mounting means carrying said current-collecting means for complete orientation; and operating means including power transmitting means adapted to be connected with the rotary mounting means for orienting and setting the current-collecting means, a hand device connected with the power transmitting means for actuating the same, a clutch means carried with the power transmitting device; and an indicator of direction connected through the clutch to the hand device and adapted to be disconnected from the power transmitting means whereby the operating means may be moved in relation to the indicator of direction to facilitate installation of the controller in service position.

In testimony whereof I affix my signature.

MORRIS M. TITTERINGTON.

CERTIFICATE OF CORRECTION.

Patent No. 1,770,246.  Granted July 8, 1930, to

MORRIS M. TITTERINGTON.

It is hereby certified that error appears in the printed specification of the above numbered patent requiring correction as follows: Page 7, line 69, strike out the word "direction"; page 9, line 26, claim 10, after the word "hub" and before the comma insert the words "to rotate therewith"; and line 27, strike out the words "to rotate therewith"; and that the said Letters Patent should be read with these corrections therein that the same may conform to the record of the case in the Patent Office.

Signed and sealed this 9th day of September, A. D. 1930.

(Seal)

M. J. Moore,
Acting Commissioner of Patents.

transmitting device; and an indicator of direction connected through the clutch to the hand device and adapted to be disconnected from the power transmitting means whereby the operating means may be moved in relation to the indicator of direction to facilitate installation of the controller in service position.

In testimony whereof I affix my signature.

MORRIS M. TITTERINGTON.

CERTIFICATE OF CORRECTION.

Patent No. 1,770,246.            Granted July 8, 1930, to

MORRIS M. TITTERINGTON.

It is hereby certified that error appears in the printed specification of the above numbered patent requiring correction as follows: Page 7, line 69, strike out the word "direction"; page 9, line 26, claim 10, after the word "hub" and before the comma insert the words "to rotate therewith"; and line 27, strike out the words "to rotate therewith"; and that the said Letters Patent should be read with these corrections therein that the same may conform to the record of the case in the Patent Office.

Signed and sealed this 9th day of September, A. D. 1930.

(Seal)

M. J. Moore,
Acting Commissioner of Patents.